(No Model.)  7 Sheets—Sheet 1.

J. H. HASKINS.
VERTICAL GANG LATHE.

No. 420,064.  Patented Jan. 28, 1890.

Witnesses
Wm A. Skinkle
C. A. Skinkle

Inventor
James H. Haskins.
By his Attorneys
Parkinson & Parkinson (No Model.) 7 Sheets—Sheet 2.
J. H. HASKINS.
VERTICAL GANG LATHE.

No. 420,064. Patented Jan. 28, 1890.

Witnesses
Wm A. Skinkle
C. A. Skinkle

Inventor
James H. Haskins
By his Attorneys
Parkinson & Parkinson

UNITED STATES PATENT OFFICE.

JAMES H. HASKINS, OF CHICAGO, ILLINOIS, ASSIGNOR TO THE McCORMICK HARVESTING MACHINE COMPANY, OF SAME PLACE.

VERTICAL GANG-LATHE.

SPECIFICATION forming part of Letters Patent No. 420,064, dated January 28, 1890.

Application filed April 5, 1889. Serial No. 306,094. (No model.)

*To all whom it may concern:*

Be it known that I, JAMES H. HASKINS, a citizen of the United States, residing at Chicago, in the county of Cook and State of Illinois, have invented certain new and useful Improvements in Lathes, of which the following is a specification.

My invention has for its object to provide compact, simple, and efficient mechanism whereby shafts or light round bodies of metal may be accurately turned in varying numbers under the care of a single attendant. Lathes for such purposes have heretofore been arranged horizontally, necessitating a space on each side of them and an attendant to each lathe, or to each two lathes at most, and requiring the attendant to pass around and between them or reach over them to get at the adjusting devices, and involving loss of much time in moving from one to the other when supervising more than a single lathe, while the shaft is apt to sag or spring from its own weight or the pressure of the cutters and be turned unevenly.

In my improvement I arrange the lathe vertically, so that the body to be turned will be carried vertically under the cutters, the head and tail stocks also sliding vertically and carrying such body with them, thereby enabling any number of lathes to be arranged side by side in a single gang, and by arranging a platform for the attendant at a suitable height and bringing all the adjusting and controlling devices to the front, where he can reach them as he passes along this platform, making it possible for almost an indefinite number of lathes to be attended by a single operator, and, since the whole weight of the body is in the direction of its length instead of transverse thereto, obviating all danger of sagging or springing.

A is a strong foundation or base plate to which is bolted the foot of the upright housing B, the latter being preferably cast in a single piece, as shown, and provided along its vertical edges with flanges *b*, whereby it may be bolted to the housings of adjoining lathes when used in a gang and to the bracing-brackets C when at the end of such gang or when used singly. The feet of the brackets are also bolted to the base-plate, which is the same width as the housing, or to the end base-plate when in a gang, thereby forming with the vertical housings a firm structure for the support of the operative parts of the lathe or lathes.

The upright housings are formed with vertical ways or cheeks D, against which is confined a long carriage E by means of keepers E', which in effect form one side of each way or cheek. This carriage has on its rear side a rack $e$, with which the feed-wheel is intended to engage, and on the front or exposed side a long dovetail rib or bar $e'$, upon which the head-stock or puppet is mounted and adjusted. At the upper end the carriage is advisably hung from a rope or chain F, supported by overhead pulleys $f$, and having at its other end a counter-balance F', in a measure commensurate with the weight of the carriage and its load.

G is the head-stock secured to the foot of the carriage and carrying the center $g$ and dog or dogs $g'$, and $g^2$ is a pinion secured to the mandrel or spindle of said head-stock and meshing with and driven by a sliding gear $g^3$ upon the vertical shaft G', supported at its lower end in a step $g^4$ and bearings $g^5$ from the base-plate, and having also a bearing $g^6$ in the foot of the carriage, which latter is herein shown as hollow throughout its length, with said shaft passing up through its center and inclosed therein, but may be of any suitable construction. The vertical shaft is grooved longitudinally, as at $g^7$, and receives a key or feather $g^8$ from the sliding pinion, which is confined upon the carriage, so as to partake of its vertical movement and remain in engagement with the pinion upon the spindle of the head-stock.

The step and lower bearing for the vertical shaft are conveniently formed in a pedestal-bracket H, secured to the base-plate, and which is further provided with horizontal bearings $h$ for a shaft H', meshing with and driving the vertical lathe-shaft by means of bevel-gears $h'$ and $h^2$, which are covered by the hood H² upon said bracket. At the rear of the bracket is another bearing $h^3$ for one end of the shaft of the speed-pulley H³, the bearing for the other end of this shaft being either in the frame-bracket at the end of the gang, as at $h^4$, or in the corresponding bearing of the adjacent lathe. The shaft H' is connected with the speed-pulley shaft by bevel-gears $h^5$ and $h^6$, and transmits motion therefrom to the head-stock, and also, through the instrumentality of a small speed-pulley H⁵ at a point along its length, belt, and opposing speed-pulley H⁶, drives the worm-shaft H⁷, upon which is mounted a worm $h^7$, and thereby eventually moves the feed-wheel and sliding carriage, as will be now explained.

Figure 1:
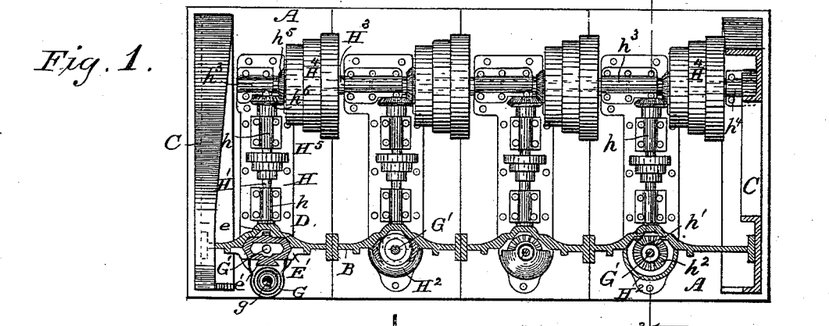
Figure 1 is a sectional plan view of a gang of lathes involving my invention, taken on the correspondingly-numbered line in the second figure.
Figure 2:
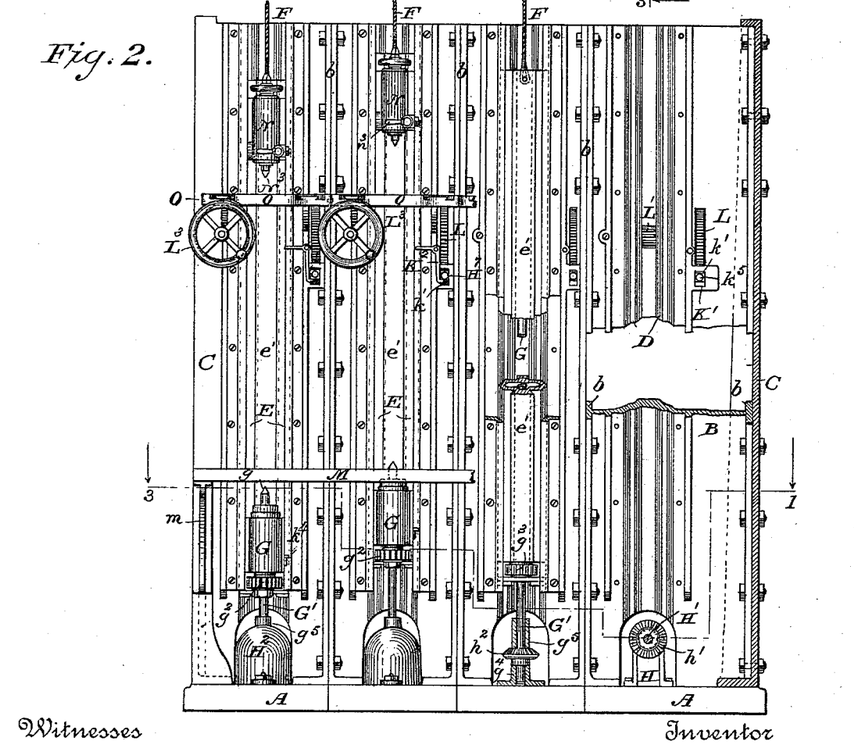
Fig. 2 is a front elevation thereof, partly broken away to more clearly expose the construction.
Figures 3, 4:
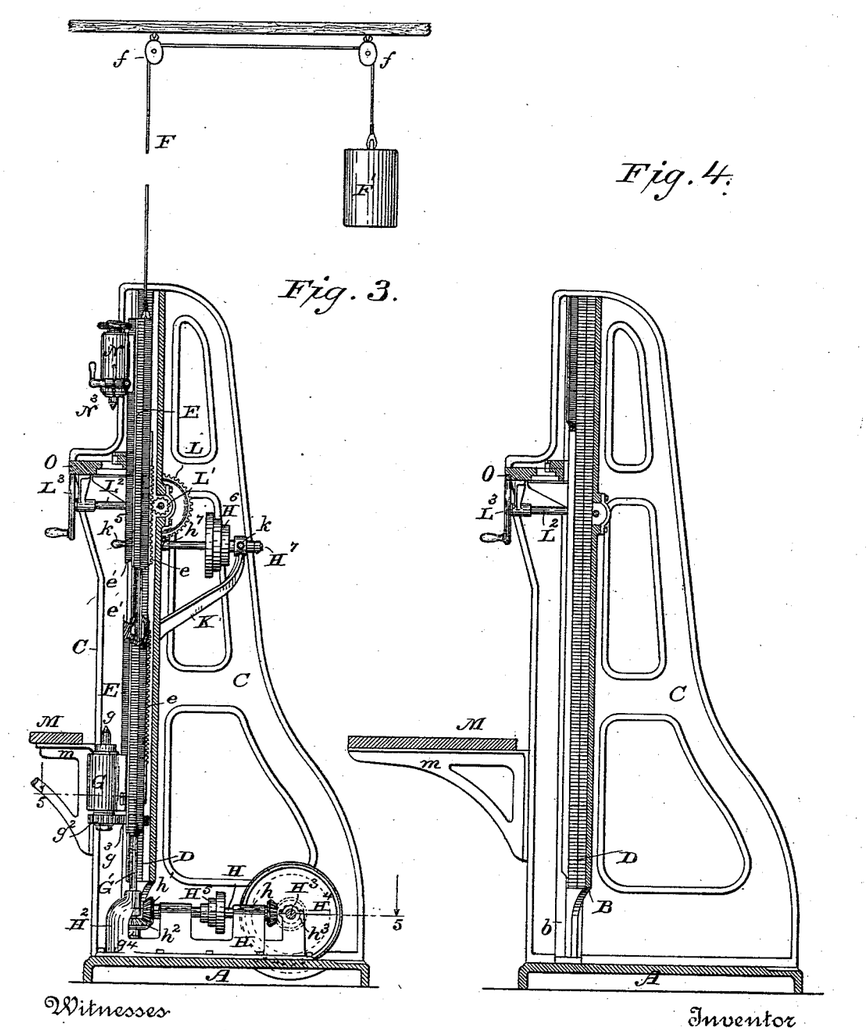
Fig. 3 is a vertical transverse section on the line 3 3 of the first figure.
Fig. 4 is a like transverse section on the same line, but with the operating parts removed.
Figure 5:
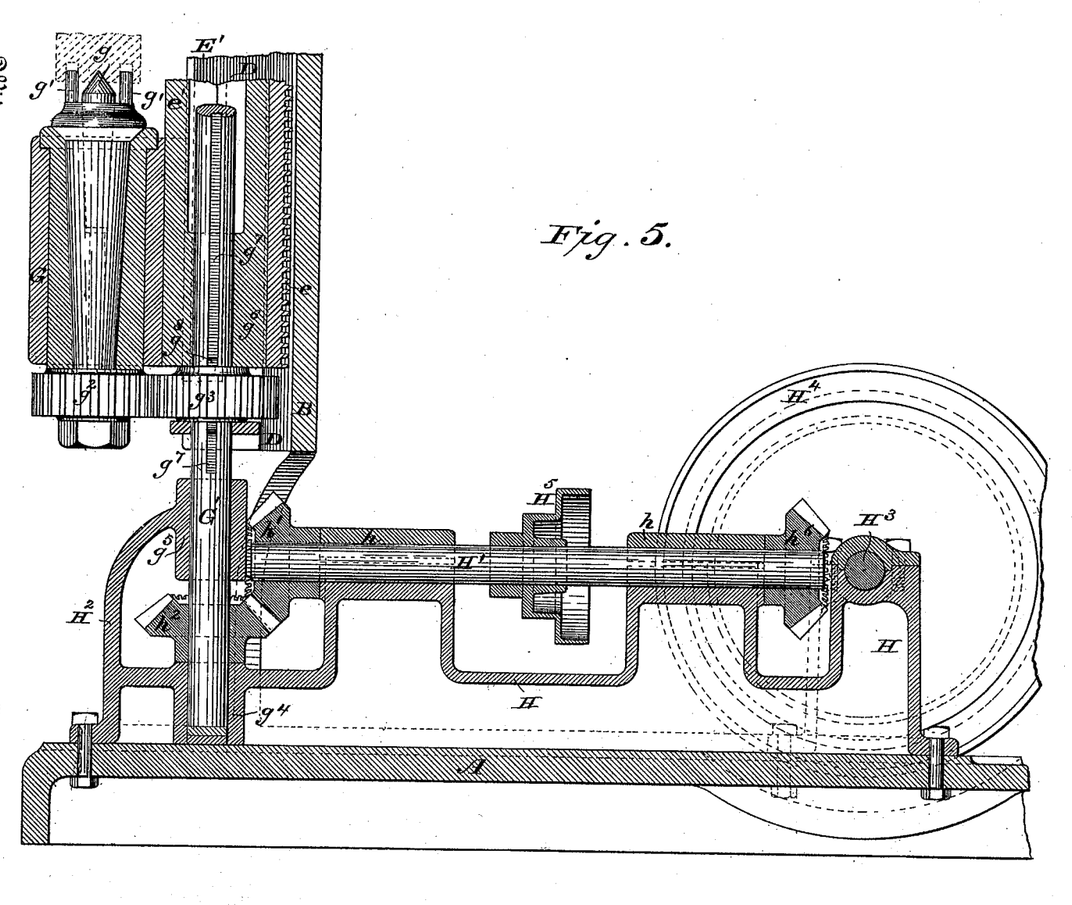
Fig. 5 is an enlarged detail on the correspondingly-numbered line in the third and sixth figures, showing the head-stock with its center and lathe dogs, the lower part of the carriage, and the gearing, whereby said head-stock is driven from the main shaft.
Figure 6:
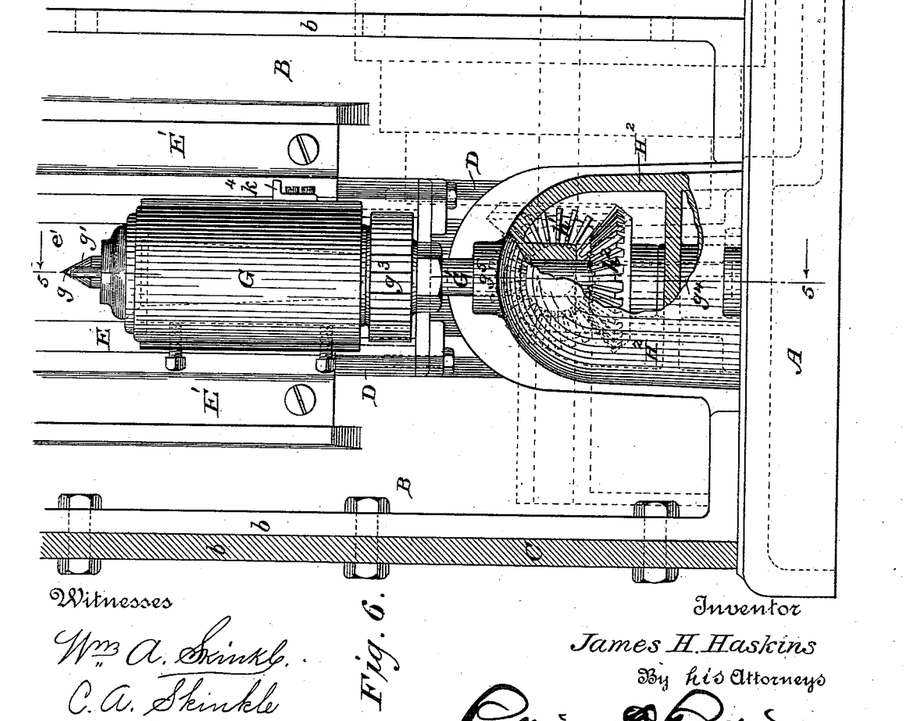
Fig. 6 is an enlarged detail of the lower part of the lathe, showing the head-stock, the pinion by which it is driven, and a part of the gearing by which motion is communicated to said pinion.
Figure 7:
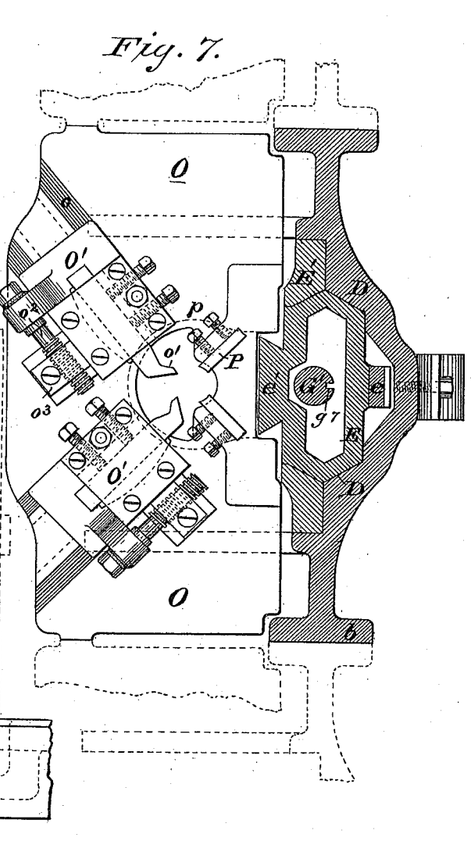
Fig. 7 is a top plan view of the cutter-head with the housing and casing sectioned on the line 7 7 of the eighth and tenth figures.
Figure 8:
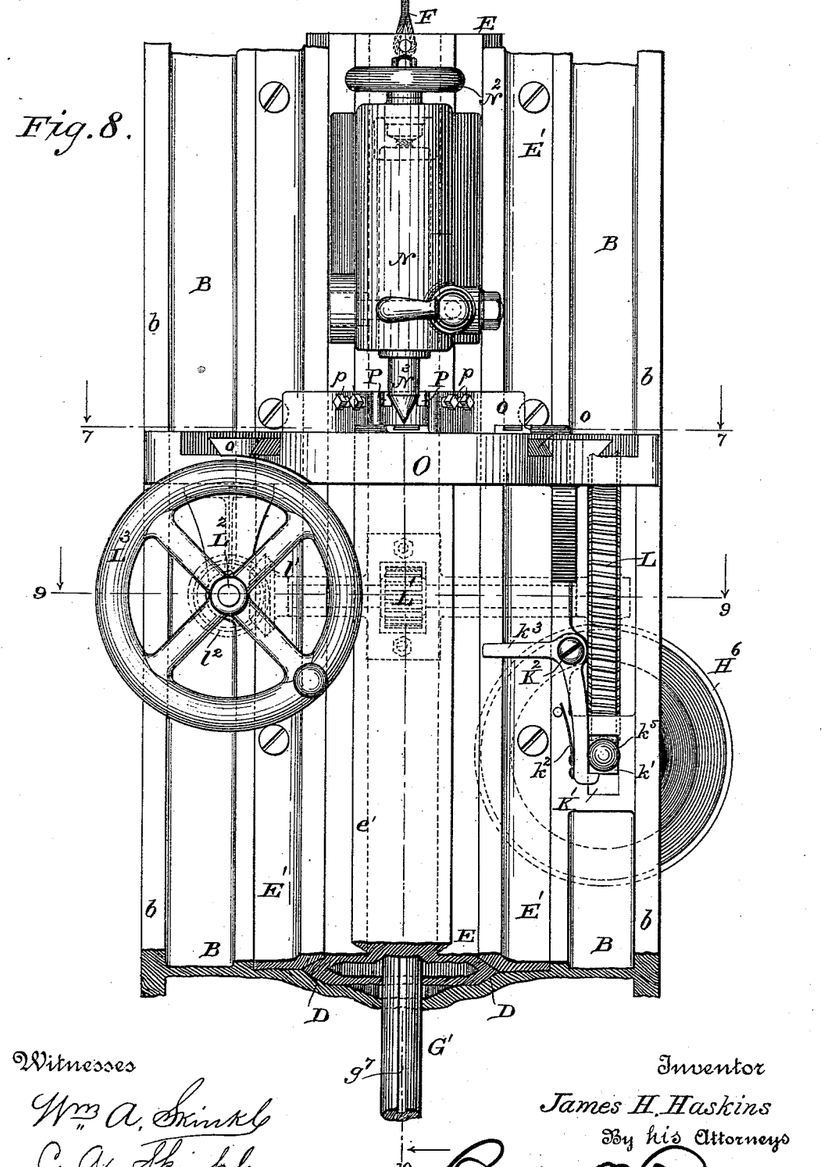
Fig. 8 is an enlarged detail in front elevation of a part of a lathe, showing the tail-stock, the cutter-head, and a portion of the housing, and of the carriage and the carriage-feed.
Figure 9:
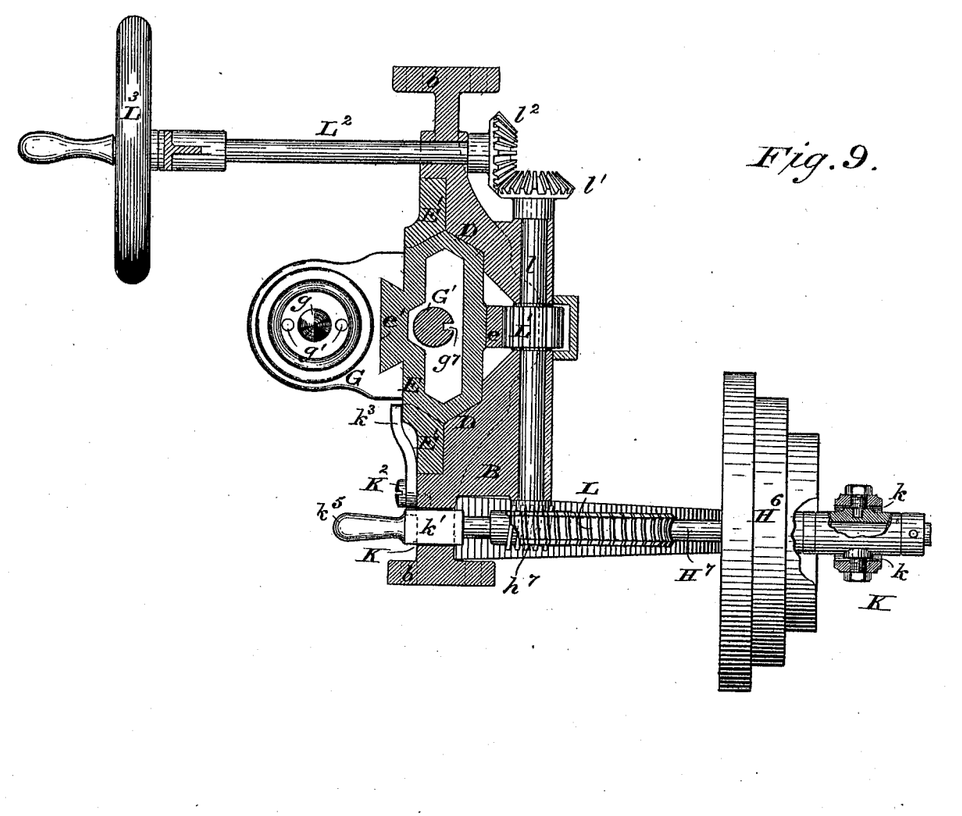
Fig. 9 is a top plan view of the carriage-feed with the housing and carriage in section on the correspondingly-numbered line in the eighth and tenth figures, and the worm-wheel of the feed partly broken away.
Figures 10, 11, 12:
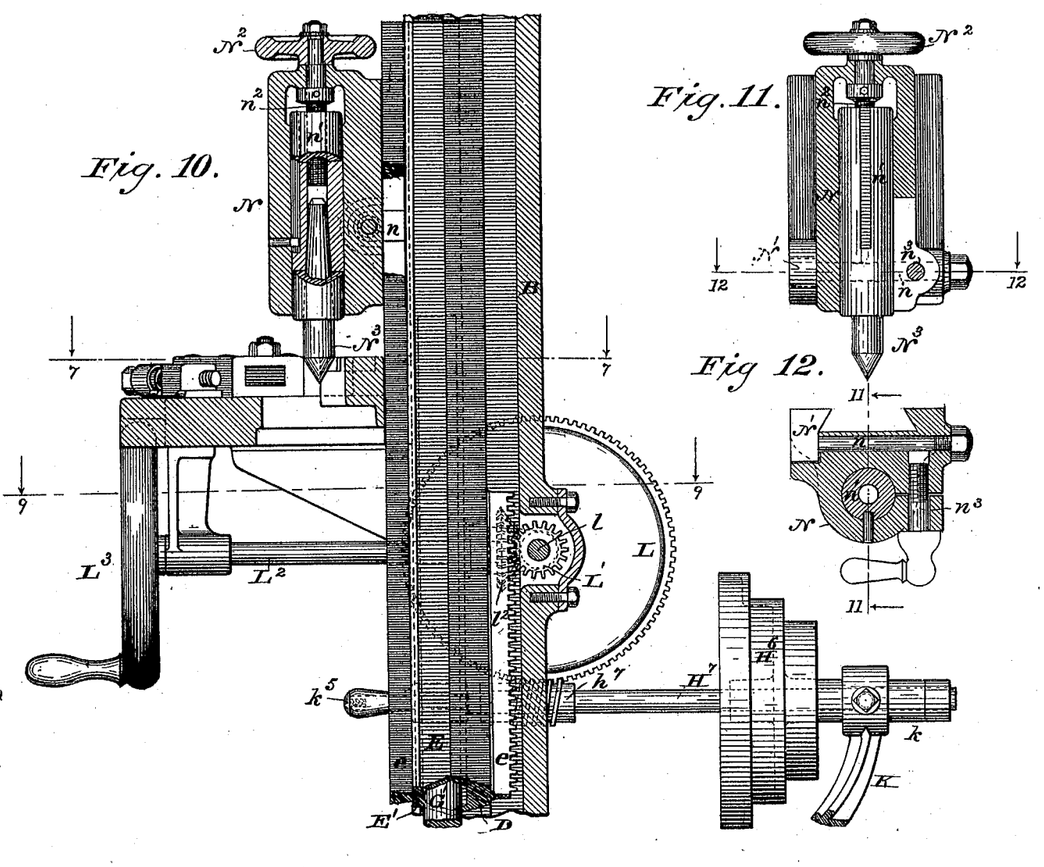
Fig. 10 is an enlarged detail in vertical section on the line 10 10 of the eighth figure, embracing the parts therein shown.
Fig. 11 is a longitudinal section through the tail-stock on the line 11 11 of the succeeding figure.
Fig. 12 is a transverse section therethrough on the line 12 12 of the preceding figure.

One end of the worm-shaft is mounted in a swiveling bearing $k$, pivoted in a bracket K at the rear of the upright housing and near the terminal of the upward traverse of the sliding carriage. The other end takes bearing in a box $k'$, which is free to slide vertically up and down in a guide-slot K' in the housing, as shown in Fig. 8, but is normally held at the top of said slot by a tripping-catch K², pressed into engagement by a spring $k^2$, and having a heel-arm $k^3$, extending horizontally, or nearly so, across the housing and into the path of a tappet $k^4$, projecting from the foot of the sliding carriage, so that when said carriage approaches the upward limit of its movement the tappet shall strike the arm and release the trip-latch, allowing the worm-shaft to fall to the extreme permitted by the guideway. The bearing-block is prolonged into a handle $k^5$, so that when the carriage has been returned to its initial position the worm-shaft may be lifted and the trip-latch again engaged.

The worm meshes with a worm-wheel on the adjacent end of a shaft $l$, mounted in a horizontal bearing at the rear of the housing and extending across the back thereof, and this shaft carries at a point along its length a pinion L, meshing with the rack on the back of the sliding carriage, and serves to lift the latter so long as the machine is in action and the worm is in engagement with the worm-wheel, which will be so long as the trip-latch is holding the worm-shaft up at the top of the guide-slot; but whenever the trip-latch is disengaged and the worm-shaft falls to the bottom of its guide-slot the worm will go out of mesh with the worm-wheel and the automatic feed will cease.

The shaft which carries the feed-wheel, and which will hereinafter be termed the "feed-shaft," has beyond the feed-pinion—that is, at the end opposite to that which carries the worm-wheel—a bevel-wheel $l'$, which meshes with another bevel-wheel $l^2$ at the rear end of a transverse shaft L², turning in a bearing formed through the housing, and having in front thereof a hand wheel or crank L³, whereby it can be controlled by the operator. This hand-wheel and its shaft are on one side of the sliding carriage while the trip-latch is on the other, and being adjacent to each other on the machine, and being about the same height, the operator may, by disengaging the trip-latch throw the automatic feed out of action and control the feed by hand to correct any defects or inaccuracies, resetting the trip-latch whenever he wishes to start the automatic feed again. The hand-wheel also serves to return the sliding carriage to position after a shaft or other body has been turned, and may be used to control the descent of the sliding carriage and its load whenever the counter-balance is not sufficient to retain the carriage at the extreme of its upward movement after the feed device has been tripped out of action.

In order to bring the operator to a sufficient height to have the entire operation under his control, a foot plank or platform M will be laid across the front of the lathe or across the front of the gang of lathes, resting upon corbels $m$ from the main bracket, or upon other suitable supports. This will ordinarily come just about the normal height of the live-center, so as not to obstruct the view of the shaft or body to be turned; but its position will of course depend upon the length of such body, while the feed-trip and feed mechanism and the hand-wheel by which the lathe is brought under control of the operator will, as already intimated, be near the upper end of the traverse of the sliding carriage and at such a height as to be conveniently reached by the attendant when standing upon the foot-platform, and at the same height, or substantially the same height, in all the lathes of the gang, the moment when the feed mechanism is tripped out of action being of course determined by the position of the tappet along the length of the sliding carriage.

N is the tail-stock, mounted vertically above the head-stock upon and adjustable along the dovetailed rib of the sliding carriage, and clamped thereto by the bolt $n$ and key N', or otherwise secured in any given adjustment. This tail-stock carries the dead-spindle $n'$, adjustable by the hand-wheel $N^2$ and screw $n^2$, and receives the dead-center $N^3$ in the ordinary tapering socket, the spindle being clamped in position, when once adjusted and carried home by the hand-wheel and screw, by means of its split bearing and binding-screw $n^3$, in the usual manner.

O is a tool table or shelf located just above the feed mechanism at a convenient height for the attendant, and having an opening for the passage of the body being turned, and provided with converging ways or guides $o$ for the tool-holders O', which carry the cutters $o'$, and are fed inward toward the shaft or other body by means of the screw $o^2$, taking into a lug $o^3$, secured to the top of the shelf.

Opposing the cutters are adjustable rests P, which may be set up against the back of the shaft, after it has been centered and clamped in position by the set-screws $p$, so as to withstand the pressure of the cutters and prevent any possible swaying.

In operation the shaft or other body to be turned is centered while the sliding table is at its lowest position in the lathe. The cutters and back rests are then adjusted, the automatic feed set in action, and the carriage begins its upward traverse under the eye of the attendant, who can at any time, by simply passing along the foot-plank from one lathe to the other, stop the feed or attend to any of the adjusting devices and correct any inaccuracies, having control of every part of the single lathe or of the gang of lathes, without the necessity of stooping over any moving part of the machinery or of going around the lathe-frame from one side to the other. When the carriage in a single lathe or any carriage in a gang of lathes has reached the termination of its upward traverse and tripped the automatic feed out of action, the attendant can return the carriage with its load to the starting-point, reset the cutters, if necessary, and again start the automatic feed, passing thence to the next lathe demanding his attention, without leaving the foot-plank upon which he stands. In a word, the whole gang of lathes will be under his eye ready to his access as he passes along the foot-plank from one end to the other.

I claim as my invention—

1. The combination, substantially as hereinbefore set forth, in a lathe, of a vertical housing having upright ways or cheeks, a carriage traversing said ways or cheeks, head and tail stocks mounted upon said carriage and in vertical line with each other, and a tool-rest past which said carriage moves in its upward traverse.

2. The combination, substantially as hereinbefore set forth, in a lathe, of the vertical cheeks, the carriage traversing said ways or cheeks, the head and tail stocks mounted upon said carriage and moving therewith, the automatic feed for said carriage, a trip-latch for said feed, and the tappet on said carriage operating said trip-latch.

3. The combination, substantially as hereinbefore set forth, in a lathe, of the vertical cheeks, the carriage traversing therein, the head and tail stocks mounted upon said carriage and moving therewith, the automatic feed, the trip-latch to throw said feed out of action, and the hand-wheel whereby the feed may be controlled when the automatic drive ceases.

4. The combination, substantially as hereinbefore set forth, in a lathe, of the vertical cheeks, the carriage traversing therein, the head-stock mounted upon the foot of said carriage, the tail-stock mounted and adjustable along the upper end thereof, the feed for said carriage, and the counter-balance.

5. The combination, substantially as hereinbefore set forth, in a lathe, of the vertical cheeks, the carriage traversing in said cheeks, the head and tail stocks mounted upon said carriage and moving therewith, the worm-shaft mounted at one end in a swiveling bearing and at the other in a vertical sliding block, a trip-latch engaging said block to hold it up, the worm meshing with the worm-wheel while the trip-latch is engaged, the feed-pinion, and the tappet upon the traversing carriage to disengage the trip-latch.

6. The combination, substantially as hereinbefore set forth, with the vertically-traversing carriage, of the automatic feed, the trip whereby said feed is thrown out of action, and the hand-wheel whereby the feed is controlled by the attendant.

7. The combination, substantially as hereinbefore set forth, with the traversing carriage, of the worm-shaft mounted at one end in a swiveling bearing and at the other in a vertically-sliding block, the feed-pinion, the trip-latch, and the hand-wheel whereby the feed is controlled when the worm-shaft is tripped out of action.

8. The combination, substantially as hereinbefore set forth, of the vertical cheeks, the carriage traversing therein, the vertical shaft running through said carriage, the pinion at the foot of the carriage sliding upon said shaft as the carriage traverses, the head-stock mounted at the foot of the carriage, its spindle and the pinion therein engaging with the pinion upon the shaft, the horizontal shaft by which said vertical shaft is driven, its speed-pulley, the automatic feed, and the speed-pulley thereon connected with the speed-pulley on said horizontal shaft.

9. The combination, substantially as hereinbefore set forth, of a series of vertical cheeks, a series of traversing carriages moving in said cheeks side by side, a series of feeds one for each of said carriages, the head and tail stocks mounted upon each carriage, stationary cutter-rests for each carriage arranged at about the same height along the series of cheeks, and controlling devices arranged along the face of the series.

10. The combination, substantially as hereinbefore set forth, of a series of vertical housings, each having vertical cheeks with traversing carriages, and head and tail stocks mounted upon said carriages arranged side by side, and independent feeds and independent driving mechanism for each of said carriages.

11. The combination, substantially as hereinbefore set forth, with the vertical lathe or series of lathes and controlling devices, of the foot-plank running along the face of said lathe or series of lathes at about the height of the live-center.

JAMES H. HASKINS.

Witnesses:
RODNEY B. SWIFT,
A. S. WELLS.